March 3, 1964     I. S. SACKS     3,123,177
VIBRATING SYSTEMS AND MEANS FOR VARYING THE
FREQUENCY OF VIBRATION
Filed Oct. 12, 1959
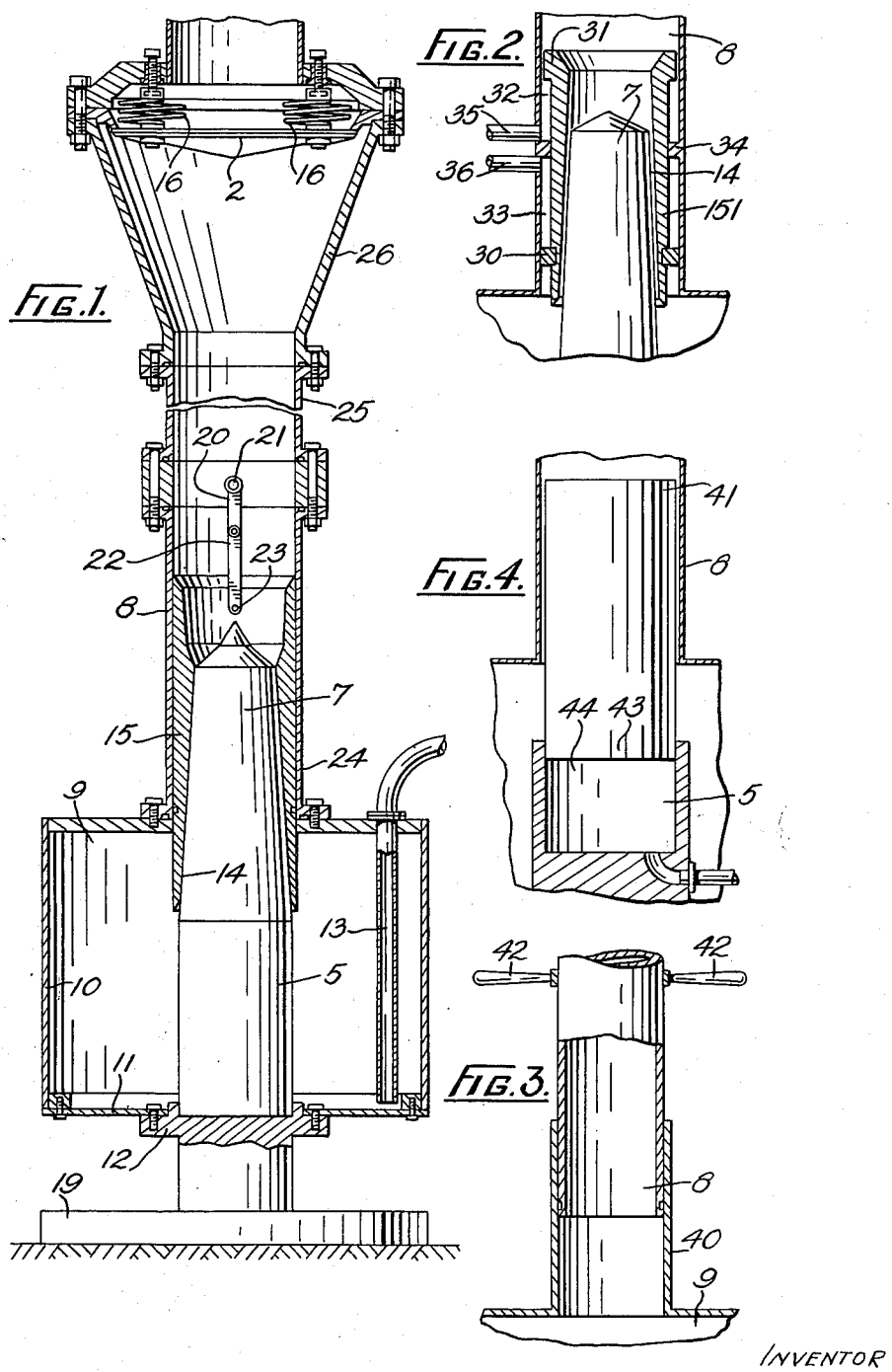
INVENTOR
IVOR S. SACKS
By Irwin S. Thompson
ATTY.

United States Patent Office 3,123,177
Patented Mar. 3, 1964

3,123,177
VIBRATING SYSTEMS AND MEANS FOR VARYING THE FREQUENCY OF VIBRATION
Ivor S. Sacks, University of the Witwatersrand, Milner Park, Johannesburg, Transvaal, Republic of South Africa
Filed Oct. 12, 1959, Ser. No. 845,915
Claims priority, application Republic of South Africa Oct. 15, 1958
7 Claims. (Cl. 181—.5)

This invention relates to vibrating systems and means for varying the frequency of vibration. The invention is mainly concerned with variable frequency transducers of the kind powerful enough to transmit vibrations suitable for use in geophysical prospecting operations.

Known ways of achieving variable frequency vibrations on the ground are contra-rotating flywheels, oscillating pressure pumps connected to water in a cavity in the ground, electrodynamic transducers and magneto-strictive transducers.

Electrodynamic transducers have the disadvantage of low efficiency because of difficulties in impedance matching. In the case of magneto-strictive transducers it is difficult to vary the frequency over a sufficient range and low frequency transducers are bulky.

Contra-rotating flywheels have been used for the purposes of geophysical exploration. As against these devices the invention proposes to provide larger frequency ranges and hence greater resolving power as well as higher rates of sweep with lower power consumption.

Devices such as the oscillating pressure pump mentioned above are bound to some form of excavation in the ground.

An object of the invention is to provide a compact and efficient device for producing vibrations in a medium of any extent. A further object of the invention is to provide a device that is adapted to be connected to a platform which rests either on the surface of the ground or is connected to a pile or the like driven into the ground.

According to the invention vibration is effected by means of a resonant sound wave in a fluid-filled, preferably liquid-filled, tube, the latter being preferably straight.

In the preferred form of the invention the resonant sound frequency of the tube is continuously varied through a range of operating frequencies.

The invention further consists in the features described below with reference to the accompanying drawings, in which:

FIGURE 1 is a section through a seismic vibrator,
FIGURE 2 is a fragmentary section through another form of frequency control mechanism for the vibrator,
FIGURE 3 is a fragmentary section through part of a further modification, and
FIGURE 4 a fragmentary section through part of still another modification.

In FIGURE 1 a solid column 5 is mounted on a massive base or platform 19 adapted to be anchored to the ground. The top 7 of the column is formed as a truncated cone capped with another double cone for streamlined flow. The top 7 enters a pipe 8 which terminates in an enlarged vessel 9. The connection between the pipe 8 and the vessel 9 is rigid and the vessel has rigid side walls 10. The base 11 of the vessel 9 is made of flexible metal which is connected to a rigid annular collar 12 on the column 5.

The assembly of pipe 8, vessel 9 and their liquid content is thus flexibly supported on the column 5.

Liquid under pressure (for a source not shown, e.g. a pump) is fed to the vessel 9 through an inlet tube 13 and passes through the space between the top 7 and a sleeve 15 into the pipe 8 as described later on the sleeve 15 is reciprocable and as illustrated in FIGURE 1 it is at the bottom of its stroke. The line 14 represents the space which exists when the sleeve 15 moves upwardly. In the modification of FIGURE 2 the space 14 is clearly visible. At the top of the pipe 8 there is a spring-loaded valve 2, the springs 16 holding the valve open for a fractional distance of the order of 0.1 and 1.0 mm. Preferably the natural frequency of vibration of the spring is greater than any one of operating frequencies.

The sleeve 15 is reciprocated by means of a crank arm 20 on a shaft 21 and a connecting link 22 pivoted on a pin 23 on the sleeve 15. Rotation of the shaft 21 by any suitable means causes the sleeve 15 to move up and down. As the sleeve 15 reciprocates the assembly vibrates at frequencies which are continuously varied between limits determined by the position of the sleeve 15. The massive base transmits these to the ground. The vessel 9 serves the purpose of filtering pressure waves emanating in the pipe 8 from the source of liquid.

It will be seen that the pipe 8 has three sections, a lower one 24 connected to the vessel 9, an intermediate one 25 and an upper one 26 carrying he valve 2. By removing the intermediate section 25 the device can operate over a different range of frequencies. Likewise a further range of frequencies can be used by adding still a further section like the section 25.

In one embodiment a pipe 8 of two sections 24 and 26, together 1.35 metres long and 7.5 cms. in diameter was used. The vessel was circular with a diameter of 30 cms. and a depth of 32.5 cms. The valve 2 was 10 cms. in diameter. A pump fed water at 6 kg./square cm. into the vessel 9. With the two sections the frequency vibration varied between 45 and 165 cycles per second and with a further section 25 which was 0.9 metre long the frequency of vibration was between 30 and 90 cycles per second. The device is easily portable.

It was estimated that with that embodiment the force output was about 454 kilograms. The results obtained showed seismically detectable strata at a depth of up to 600 metres in the earth. These results were confirmed by borehole results.

A similar device with an output of up to 40,000 kg. can be carried on a 5,000 kg. truck.

FIGURE 2 shows an improved way of reciprocating the sleeve 15. In this case the sleeve is mounted as an annular piston of a double acting ram in the pipe 8. Two sealing rings 30 and 31 at the ends of the sleeve 15 seal off annular space which is divided into two annular chambers 32 and 33 by means of an annular rib 34 on the pipe 8 in sealing contact with the sleeve 15. Tubes 35 and 36 lead to the chambers 32 and 33. By varying the pressure of a hydraulic fluid in the chambers 32 and 33 in a known manner, not shown, a reciprocal motion may be obtained.

It will be appreciated that the sleeve 15 may be fixed and the top 7 arranged to move into and out of the sleeve. Furthermore, many other types of mechanism for achieving reciprocating motion may be used.

A simpler form of the invention is illustrated in FIGURE 3. In this case the vessel 9 is formed with a short tubular extension 40. The pipe 8 is caused to telecope in and out of the extension 40 to vary the resonant sound frequency of the tube 8. In all other respects the tube and the vessel are the same as in FIGURE 1. The tube may be reciprocated by any suitable device. In a practical example the tube was fitted with handles 42 and reciprocated by hand.

Another simple form of the invention is shown in FIGURE 4. There the column 5 is formed with its top as a cylindrical spigot 41 movable in and out of the pipe 8. The movement may again be by any suitable mechanism. As shown the spigot 41 at its lower end is connected to a piston 43 movable in a cylinder 44 in the thickness of the column 5. Pressure fluid admitted to and released from the cylinder 44 in a well known manner causes the spigot 41 to move up and down.

The utility of the platform 19 is that it may rest on the ground or that it may be connected to a pile or the like driven into the ground. In the first case the shape and area of the platform 19 may be chosen in such a way as to achieve maximum coupling efficiency. Furthermore, by adjusting the size of the platform 19 in relation to the wave length it is possible to control the directional characteristics of the radiation pattern. This is of particular advantage in reflection prospecting where it is desirable for most of the energy to be concentrated in a vertical lobe.

I claim:

1. Apparatus for creating vibrations, as is used for imparting sound waves to the earth in geophysical exploration consisting in an enclosed vessel, means adapted to couple the vessel to the earth, an inlet pipe to the vessel, a tube having an inlet end connected to the vessel and having an outlet end in which there is a valve that is resiliently biased to open against flow from the inlet end of the tube to the outlet end of the tube, and means at the inlet end of the tube that is continuously operable to displace continuously the effective end of the tube with respect to sound waves emanating at the valve through a desired range of positions.

2. Apparatus for creating vibrations, as is used for imparting sound waves to the earth in geophysical exploration consisting in an enclosed vessel, means adapted to couple the vessel to the earth, an inlet pipe to the vessel, an elongated outlet socket to the vessel, a tube arranged to be a slide fit in the socket and having its inlet end in the socket and its outlet end controlled by a valve in that end, which valve is resiliently biased to open against flow from the inlet end of the tube to the outlet end of the tube, and handle means for moving the tube so that the inlet end of the tube slides along the length of the socket.

3. Apparatus for creating vibrations, as is used for imparting sound waves to the earth in geophysical exploration, consisting in an enclosed vessel, means adapted to couple the vessel to the earth, an inlet pipe to the vessel, a tube having an inlet end connected to the vessel and having an outlet end in which there is a valve that is resiliently biased to open against flow of fluid from the inlet end of the tube to the outlet end of the tube, a piston that is arranged to move over a predetermined distance along the length of the tube at the inlet end of the tube and that is of an area less than the inner cross-sectional area of the tube, and means operable to move the piston back and forth over the predetermined distance.

4. Apparatus for creating vibrations, as is used for imparting sound waves to the earth in geophysical exploration, consisting in an enclosed vessel, an inlet pipe to the vessel, a tube having a straight inlet end connected to the vessel and an outlet end in which there is a valve that is resiliently biased to open against flow of fluid from the inlet end of the tube to the outlet end of the tube, a reaction member fixed to the vessel and adapted to couple the vessel to the earth, the member being formed with a cone that projects into the inlet end of the tube, a sleeve that is a slide fit in the inlet end of the tube and the inner surface of which is formed of truncated conical shape complemental to the cone on the reaction member, and means operable to move the sleeve continuously away from and towards the cone over a desired distance.

5. The apparatus claimed in claim 4 in which the means to move the sleeve comprises a crank mechanism on a shaft journalled in the tube.

6. The apparatus claimed in claim 4 in which the outer surface of the sleeve is formed with a circumferential groove, the tube has a circumferential ring on its inner surface in engagement with the groove, and including means to admit pressure fluid into the groove to either side of the ring.

7. The apparatus claim in claim 4 in which the reaction member includes a rigid platform which is of a size and shape chosen to given optimum directional properties and coupling.

References Cited in the file of this patent

UNITED STATES PATENTS

| | | |
|---|---|---|
| 1,169,687 | Skinner | Jan. 25, 1916 |
| 2,281,751 | Cloud | May 5, 1942 |
| 2,424,108 | Merten | July 15, 1947 |